(12) United States Patent
Flinta et al.

(10) Patent No.: US 8,706,851 B2
(45) Date of Patent: Apr. 22, 2014

(54) CONFIGURATION OF A NETWORK NODE USING CAPTIVE MODE

(75) Inventors: Christofer Flinta, Stockholm (SE); Jan-Erik Mangs, Solna (SE); Bob Melander, Sigtuna (SE)

(73) Assignee: Telefonaktiebolaget L M Ericsson (Publ), Stockholm (SE)

( * ) Notice: Subject to any disclaimer, the term of this patent is extended or adjusted under 35 U.S.C. 154(b) by 216 days.

(21) Appl. No.: 13/128,786

(22) PCT Filed: Nov. 14, 2008

(86) PCT No.: PCT/SE2008/051313
§ 371 (c)(1),
(2), (4) Date: May 11, 2011

(87) PCT Pub. No.: WO2010/056168
PCT Pub. Date: May 20, 2010

(65) Prior Publication Data
US 2011/0252120 A1    Oct. 13, 2011

(51) Int. Cl.
*G06F 15/177* (2006.01)
(52) U.S. Cl.
USPC ............ 709/221; 370/230; 370/338; 370/389
(58) Field of Classification Search
USPC .......... 709/220, 222, 223, 217; 370/230, 389, 370/338; 726/12, 22, 26
See application file for complete search history.

(56) References Cited

U.S. PATENT DOCUMENTS

| | | | |
|---|---|---|---|
| 2004/0100934 A1* | 5/2004 | Kachi ........................... | 370/338 |
| 2006/0031394 A1* | 2/2006 | Tazuma ........................ | 709/217 |
| 2006/0117384 A1* | 6/2006 | Larson et al. .................. | 726/22 |
| 2007/0058538 A1* | 3/2007 | Chiang et al. ................. | 370/230 |
| 2007/0223470 A1* | 9/2007 | Stahl ............................. | 370/389 |
| 2009/0019536 A1* | 1/2009 | Green et al. ................... | 726/12 |

OTHER PUBLICATIONS

TG Publishing Team: "HeadToHead: 3Com Office Connect vs. NETGEAR Wireless 54Mbps Travel Routers" TOM'S GUIDE, [Online] Nov. 4, 2004, XP007909340 Retrieved from the Internet: URL:http://www.tomsguide.com/uslindex.php?ctrl=dossierprint &pl=336> [retrieved on Sep. 7, 2009].
NETGEAR: "Reference Manual for the 54 Mbps Wireless Travel Router WGR101" [Online] Feb. 2005, XP007909339 Retrieved from the Internet: URL:http://www.retrevo.com/d/df/wgrl01_refmanual.pdf?doc=af88fa645bebc081efe5f8b5e35191a8 &ts=1248874132849> [retrieved on Jul. 29, 2009].

* cited by examiner

*Primary Examiner* — Andrew Chriss
*Assistant Examiner* — Peter Mak (57) ABSTRACT

The invention relates to a network node arranged to provide an end user of a network terminal in a local network with an access link to an external network, said network node is arranged to be connected between said local network and said external network. The network node is characterized in that it comprises a control unit arranged to in response to receiving a first triggering information, switch said network node from a normal operational mode into a captive mode, in which said control unit is further arranged to intercept any request from said network terminals to said external network, resolve said request to the IP address of the network node in the local network such that gateway information to the end user of said network terminals is provided. The invention also relates to a method for use in a network node and a computer program product.

12 Claims, 5 Drawing Sheets

CONFIGURATION OF A NETWORK NODE USING CAPTIVE MODE

TECHNICAL FIELD

The invention relates in general to a network node. The invention further relates to a method for use in a network node and a computer program product for use in a network node.

BACKGROUND

A network node as referred to herein may be implemented in various types of network environments such as in company networks, office networks, residential networks, etc., for providing access to external networks, such as, the Internet or other interconnecting networks. However, the functionality of the network node may most fittingly be described in reference to a residential gateway implemented in a residential network.

A residential gateway is a kind of network equipment found in most homes today. The residential gateway, also referred to as home gateway, is a hardware device connecting a home network to external networks, for example, a wide area network (WAN) such as the Internet.

A residential gateway may combine the functions of an IP router, multi-port Ethernet switch and WiFi access point. It may also provide port translation functionality (NAT), support for localized Quality of Service (QoS) enforcement and also serves as a dynamic DNS client, etc. The residential gateway may be arranged between a modem and the residential network, or an xDSL or cable modem may be integrated into the residential gateway. Thus, the residential gateway has a connection, such as, an Ethernet connection or xDSL connection, which it may use to connect to the external networks, WANs or the Internet.

Physically, a residential gateway is usually provided with a few simple lights, for example, LEDs, in order to indicate the status of the gateway to a user of a network terminal in the residential network. These may indicate, for example, if the gateway is turned on/off, whether a DSL link has been established or not, or whether the IP address configuration to an external network has succeeded or not. In this way, the residential gateway may automatically only convey a restricted amount of information using very limited means.

Furthermore, a residential gateway typically provides an interface to its configuration, settings and other status information. This may be performed by running a local web server. The local web server provides a web page comprising said gateway information. A skilled user may access the web page by typing in the numerical IP address of the residential gateway in an address field of a web browser. However, this requires knowledge about the numerical IP address of the residential gateway; sometimes also a user name and a password. It also requires that the network terminal has established correct IP configurations and/or has been configured with a domain name server (DNS). These procedures are often considered complex and sometimes overwhelmingly difficult for an unskilled user.

SUMMARY

A problem to which the invention relates is the problem of conveying gateway information to an unskilled user of a network terminal.

The invention relates to a network node arranged to provide an end user of a network terminal in a local network with an access link to an external network, said network node is arranged to be connected between said local network and said external network, characterized in that the network node comprises a control unit arranged to in response to receiving a first triggering information, switch said network node from a normal operational mode into a captive mode, in which said control unit is further arranged to intercept any request from said network terminals to said external network, resolve said request to the IP address of the network node in the local network such that gateway information to the end user of said network terminals is provided.

The invention also relates to a method for use in a network node providing end users of networks terminals in a local network with an access link to an external network, wherein said network node is arranged to be connected between said local network and said external network, characterized by the steps of: switching, in response to receiving a first triggering information, from a normal operational mode into a captive mode; intercepting any request from said network terminals to said external network; resolving said request to the IP address of the network node in the local network such that gateway information to the end user of said network terminals is provided.

The invention further relates to a computer program product for use in a network node in a local network, which comprises computer readable code means, which when run in a control unit in the network node causes said control unit to perform the steps of: switching, in response to receiving a first triggering information, said network node from an normal operational mode into a captive mode; intercepting any request from said network terminals to an external network; and resolving said requests to the IP address of the network node in the local network such that gateway information to the end user of said network terminals is provided.

By being provided with said first triggering information, the network node according to the above is arranged to instantly direct the user of the network terminal towards a status and configuration web page provided in the network node. This allows an unskilled user to get access to the gateway status information in a quick and easy manner.

An advantage of the above described invention is that the user of the network terminal will be instantly directed towards the status and configuration web page provided in the network node regardless of which web page the user tries to access and by just opening up a window of a web browser.

Preferably, the network node according to the above described invention is also arranged to handle situations where a network terminal has not been configured with a name resolver and/or has not acquired an IP configuration. In such situations, the network terminal will not transmit a HTTP request. This will not be performed even if the network terminal is instructed to do so by the user in a web browser. That is because the name lookup will fail due to missing a DNS configuration. This problem is solved by the network node by being arranged to resolve domain name server (DNS) requests to the IP address of the network node in the local network, and resolve or respond to hypertext transfer protocol (HTTP) requests with the contents at the IP address of the network node in the local network, i.e. providing the status and configuration web page. The problem is further solved by the network node by being arranged to provide a network terminal with a local IP configuration, if said network terminal has not yet been assigned an IP configuration or upon receiving a dynamic host configuration protocol (DHCP) request from the network terminal.

Thus, an unskilled user of the network terminal and the network node may still be able to access the gateway status information in situations where connectivity problems are experienced in the local network due to a non-completed IP configuration and/or a missing a DNS configuration.

The network node may also be arranged to, in response to receiving a second triggering information, switch back to its normal operational mode. The first and/or second triggering information described above may be a trigger event. These features enable a gateway provider, such as, an internet service provider (ISP), to remotely trigger the network node to switch into the captive mode. This may be performed by the gateway provider sending a trigger signal to the network node. The features further enable the network node to automatically switch into a captive mode upon detecting said trigger event, which also may be, for example, the detection of an error in the connectivity or that a DNS server can not be reached.

Furthermore, the network node may comprise an input device arranged to transmit the first and/or second triggering information to the control unit in response to receiving a manual input. The input device may be a button located on the network node. This feature enables the user of the network terminal to in a quick and easy way provide said first triggering information to the network node in order to be instantly directed towards the status and configuration web page provided in the network node upon opening a window of a web browser in the network terminal.

Further advantageous embodiments of the network node, the method and the computer program product are set forth in the dependent claims, which correspondingly describe further advantageous embodiments of the invention.

BRIEF DESCRIPTION OF THE DRAWINGS

The invention will be described in more detail in the following with reference to the appended drawings, in which.

DETAILED DESCRIPTION

Figure 1:
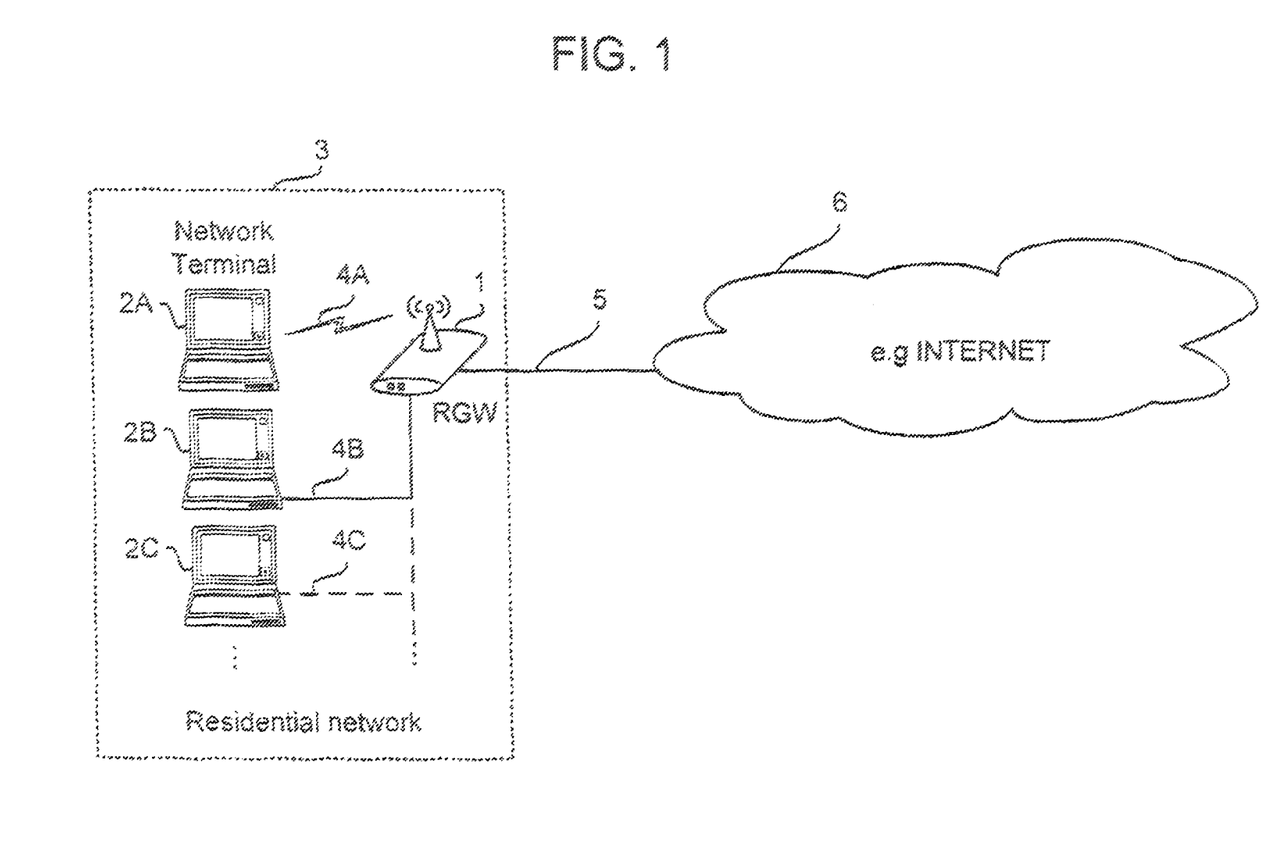
FIG. 1 shows a network node connecting a local network to an external network.

The functionality of the network node according to the invention is most fittingly described in reference to a residential gateway implemented in a residential network, as shown in FIG. 1, but it should be noted that the network node according to the invention may be implemented in or connected to various different types of network environments, such as, for example, company networks, office networks, etc. The network node according to the invention may be thus be arranged to provide said local network with an access link to external networks, such as, for example, the Internet or other interconnecting networks.

FIG. 1 shows a residential gateway (RGW) 1 connecting a residential network 3 to an external network 6. In FIG. 1, a residential gateway 1 is located in a residential network 3. The residential gateway 1 may comprise a xDSL or cable modem, or may be arranged between the residential network 3 and a modem (not shown). The modem provides a connection 5 for the residential gateway 1 to an external network 6, e.g. the Internet.

The residential network 3 may comprise at least one network terminal 2A, 2B, 2C. The residential gateway 1 is arranged to communicate with the at least one network terminal 2A, 2B, 2C over at least one connection 4A, 4B, 4C. The at least one connection 4A, 4B, 4C may be a wireless connection 4A (e.g. WiFi) or a physical connection 4B, 4C (e.g. Ethernet cable). The residential gateway 1 may thus provide an access link to the external network 6 for the at least one network terminal 2A, 2B, 2C in the residential network 3 over the connection 5.

The residential gateway 1 may provide an interface to its configuration, settings and other status information by running a local web server. The local web server may provide a web page comprising said gateway status information. A skilled user of the at least one network terminal 2A, 2B, 2C in the residential network 3 may access the web page comprised in the residential gateway 1. This may be performed by typing in the numerical IP address of the residential gateway 1 in an address field of an active window of a web browser running in the at least one network terminal 2A, 2B, 2C.

However, this requires knowledge about the numerical IP address of the residential gateway, and sometimes also a user name and a password. It also requires that the network terminal has established correct IP configurations and/or has been configured with a domain name server (DNS). These procedures may be considered complex and sometimes overwhelmingly difficult for an unskilled user.

An exemplary situation which describe a typical problem with existing solutions is when an unskilled user of the at least one network terminal 2A, 2B, 2C in the residential network 3 is experiencing problems with the network connection 5 provided by the residential gateway 1. Typically, an unskilled user then calls a support line of the internet service provider (ISP). However, if the unskilled user does not know how to access the gateway status information web page in the residential gateway 1, it may be a very time consuming task for the support staff to instruct the unskilled user of, for example, how to proceed in order to access the gateway status and configuration information web page, etc. This will result in additional costs for the internet service provider and require a larger support staff in order to shorten the waiting times of support calls and achieve a high client satisfaction.

Therefore, a problem to which the inventive features of the invention relate is the problem of how to convey gateway information to an unskilled user of a network terminal.

Figure 2:
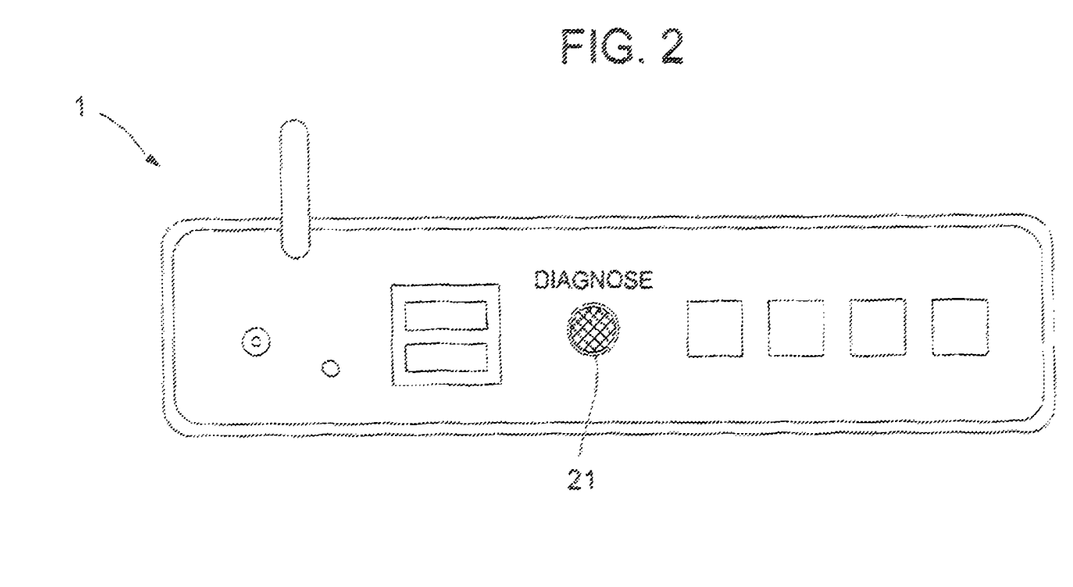
FIG. 2 shows a view from the back of a network node according to an exemplary embodiment of the invention.

FIG. 2 shows a view from the back of a residential gateway 1 according to an exemplary embodiment of the invention. Here, the residential gateway 1 is provided with an input device in the form of a button 21. The button 21 is preferably clearly distinguishable and easily noticeable. This may be performed by the button 21 having a distinct colour, for example, bright red. The housing of the residential gateway 1 may also be provided with an explanatory text indicating the use of the button 21, such as, for example, "DIAGNOSE" as shown in FIG. 2. The button 21 may be arranged such that when pressed by a user of the at least one network terminal 2A, 2B, 2C, it indicates to the residential gateway 1 that the user is requesting access to the gateway status information web page.

The residential gateway 1 according to the inventive features of the invention may thus be arranged to respond by providing the network terminal 2A, 2B, 2C with the gateway status information web page independently of which web site or web page the user of the network terminal 2A, 2B, 2C tries to access. This will be described by the exemplary embodiments according to the following.

It should also be understood that the button 21 according to the above is a preferred embodiment, but that the triggering function of the button 21 may also be implemented in the residential gateway 1 as any form of trigger event or the like. According to this alternative, the residential gateway 1 may be arranged to detect and interpret the trigger event such as indicating to the residential gateway 1 that the user is requesting access to the gateway status information web page, or that the user should be instantly directed towards the gateway status information web. The trigger event may be, for example, receiving in the residential gateway 1 a triggering signal from an ISP, operator or the like, detecting an error in the connectivity towards the external network 6 (e.g. loss of connectivity over the connection 5 towards the Internet), or the residential gateway 1 not being able to reach a DNS server, etc. Therefore, although the residential gateway 1 is described in the following as comprising an input device, e.g. the button 21, it is to be understood that this input device may be replaced in all of the exemplary embodiments below by a trigger event or the like, as described above.

Figure 3:
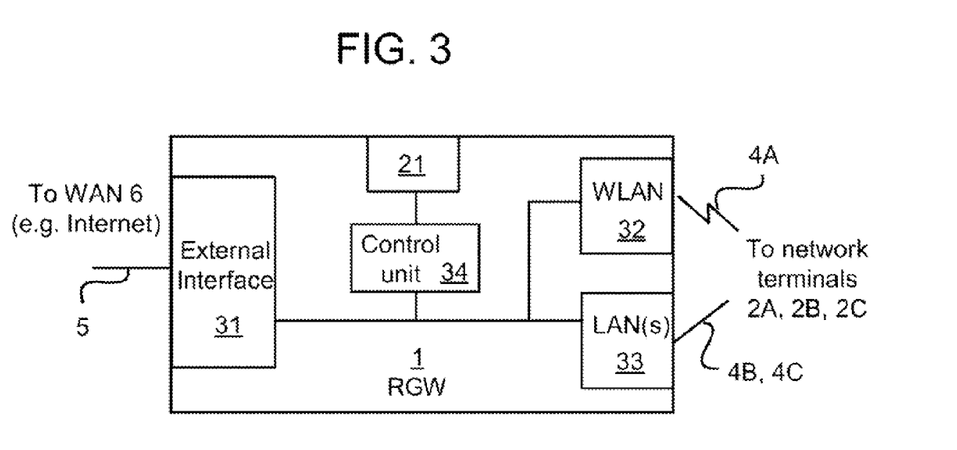
FIG. 3 illustrates a network node according to an exemplary embodiment of the invention.

FIG. 3 illustrates a residential gateway 1 according to an exemplary embodiment of the invention. The residential gateway 1 comprises an external interface 31 for providing a connection 5 to an external network 6, such as, for example, a WAN or the Internet. The external interface 31 may comprise a xDSL or cable modem, or may be arranged to be connected to an external modem (not shown). The external interface 31 may be connected to at least one internal interface 32, 33 in the residential gateway 1. The at least one internal interface 32, 33 may be, for example, a Wireless-LAN (WLAN) interface 32 for connecting the residential gateway 1 to one or several network terminals 2A, 2B, 2C over a wireless connection 4A, and/or an local area network (LAN) interface 33 for connecting the residential gateway 1 to a network terminal 3 over a physical connection 4B, 4C. The physical connection 4B, 4C may be established using, for example, an Ethernet cable.

The residential gateway 1 may also comprise an input device 21. The input device 21 may be a button that is manually accessible from the outside of the residential gateway 1 (see FIG. 2). The input device 21 may be arranged to transmit triggering information to a control unit 34 indicating that a user of a network terminal 2A, 2B, 2C is requesting access to the gateway status information web page. This may be performed in response to the input device 21 receiving manual inputs from the end user of said network terminal 2A, 2B, 2C, such as, for example, pushing the button 21 in FIG. 2.

Furthermore, the residential gateway 1 comprises a control unit 34. The control unit 34 may be connected to the external interface 31, the at least one internal interface 32, 33, and the input device 21. The control unit 34 may be arranged to receive triggering information from the input device 21 indicating that a user of a network terminal 2A, 2B, 2C is requesting access to the gateway status information web page. The control unit 34 may also be arranged to detect a trigger event that indicates that an end user of the network terminal 2A, 2B, 2C should be instantly directed towards the gateway status information web. The control unit 34 may also comprise a local web server or web server functionality arranged to provide a status information web page for the residential gateway 1.

It should be noted that the control unit 34 comprises logic for performing the functionality of the residential gateway 1. This functionality may be implemented by means of a software or computer program. The control unit 34 may also comprise storage means or a memory unit for storing the computer program and processing means or a processing unit, such as a microprocessor, for executing the computer program. The storage means may also be readable storage medium separated from, but connected to the control unit 34. When, in the above and in the following, it is described that the residential gateway 1 performs a certain function it is to be understood that the control unit 34 in the residential gateway 1 uses the processing means to execute a certain part of the program which is stored in the storage means.

Upon receiving triggering information from the input device 21 indicating that a user of a network terminal 2A, 2B, 2C is requesting access to the gateway status information web page, or upon detecting a trigger event or the like, the residential gateway 1 may be arranged to switch from its normal operational mode to a captive mode. In the normal operational mode, the residential gateway 1 performs the ordinary functionality of a residential gateway. The functionality of the residential gateway 1 may be described as comprising the functionalities of, for example, cable modems, DSL modems, routers, wireless routers, switches, VoIP ATA devices, wireless access points or any combination of the above or the like.

However, in the captive mode, the residential gateway 1 is arranged to intercept any request from the network terminals 2A, 2B, 2C. The requests may, for example, be domain name server (DNS) requests or hypertext transfer protocol (HTTP) requests. This means, for example, that the residential gateway 1 in the captive mode will intercept the DNS and/or HTTP requests which may be sent from the network terminal 2A, 2B, 2C when a user opens up a web browser in the network terminal 2A, 2B, 2C, and/or types in a web or home page address in the address field of the web browser. The requests may also be requests that indicate to the residential gateway 1 that the network terminal 2A, 2B, 2C has not been assigned an IP configuration yet. An example of such a request is a dynamic host configuration protocol (DHCP) request.

Also, in the captive mode, the residential gateway 1 is arranged to resolve all DNS and/or HTTP requests to an IP address of the residential gateway 1 in the residential network 3. This means, for example, that all DNS requests may be resolved to the IP address of the residential gateway 1 in the residential network 3, and that all hypertext transfer protocol (HTTP) requests may be resolved or responded to with the gateway status information web page associated to the IP address of the residential gateway 1 by the local web server in the residential gateway 1.

Additionally, if the request is a request that indicates to the residential gateway 1 that the network terminal 2A, 2B, 2C has not been assigned an IP configuration yet, the residential gateway 1 may be arranged to provide the network terminal 2A, 2B, 2C with an appropriate IP configuration. Also, upon receiving a DHCP request, the residential gateway 1 may specify itself as a name resolver.

The control unit 34 in the residential gateway 1 may further be arranged to receive a second triggering information which indicates that an end user of said network terminal 2A, 2B, 2C is requesting the residential gateway 1 to return to the normal operational mode. This second triggering information may be provided by the input device 21, for example, by the end user of the network terminal 2A, 2B, 2C again pressing the button 21 in FIG. 2, or by detecting a trigger event as mentioned above. Alternatively, this second triggering information may be provided by an end user of the network terminal 2A, 2B, 2C through the gateway status information web page. The gateway status information web page, which may be associated with the IP address of the residential gateway 1 by the local web server, may comprise a button, a link or similar web page object, which thus may be displayed in the active window of a browser in the networks terminal 2A, 2B, 2C when displaying the gateway status information web page. By clicking the button, link or similar web page object displayed in the gateway status information web page, the end user of the network terminal 2A, 2B, 2C may provide the control unit 34 in the residential gateway 1 with the second triggering information. In response to receiving said second triggering information, the residential gateway 1 may be arranged to switch back to its normal operational mode.

In a further embodiment of the invention, the control unit 34 in the residential gateway 1 may also comprise a DNS cache which allows it to act as a name resolver for the network terminal 2A, 2B, 2C. The DNS cache may, for example, comprise the IP addresses of some of the most common web site visited by the end user of the network terminal 2A, 2B, 2C. This could be advantageous if the name resolver of the internet service provider (ISP) is erroneous or down.

Figure 4:
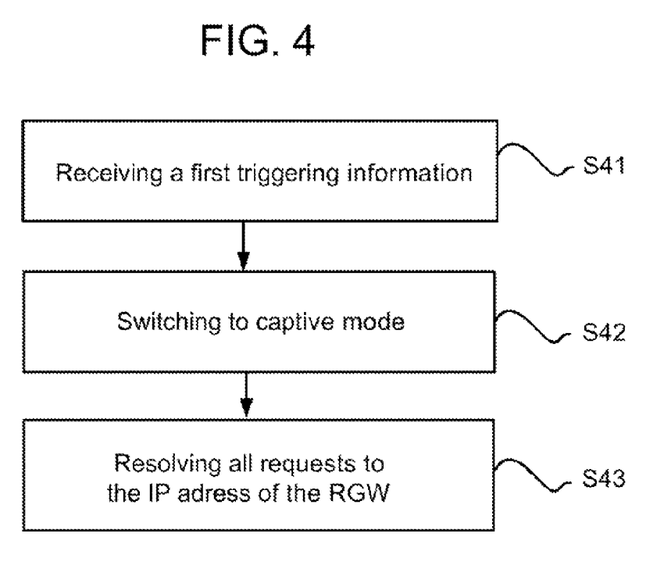
FIG. 4 is a flowchart illustrating a method according to an exemplary embodiment of the invention.

FIG. 4 is a flowchart illustrating a method according to an exemplary embodiment of the invention. In step S41, the residential gateway 1 may receive a first triggering information indicating that an end user of the network terminal 2A, 2B, 2C is requesting gateway information, or that the end user of the network terminal 2A, 2B, 2C should be instantly directed towards the gateway status information web.

In step S42, the residential gateway 1 may, in response to receiving the first triggering information in step S41, switch the residential gateway 1 from a normal operational mode into a captive mode in which any request from any network terminal 2A, 2B, 2C is intercepted. In step S43, the residential gateway 1 may resolve all requests to the IP address of the residential gateway 1 in the residential network 3, thereby providing the gateway information to the end user of the networks terminal 2A, 2B, 2C.

Figure 5:
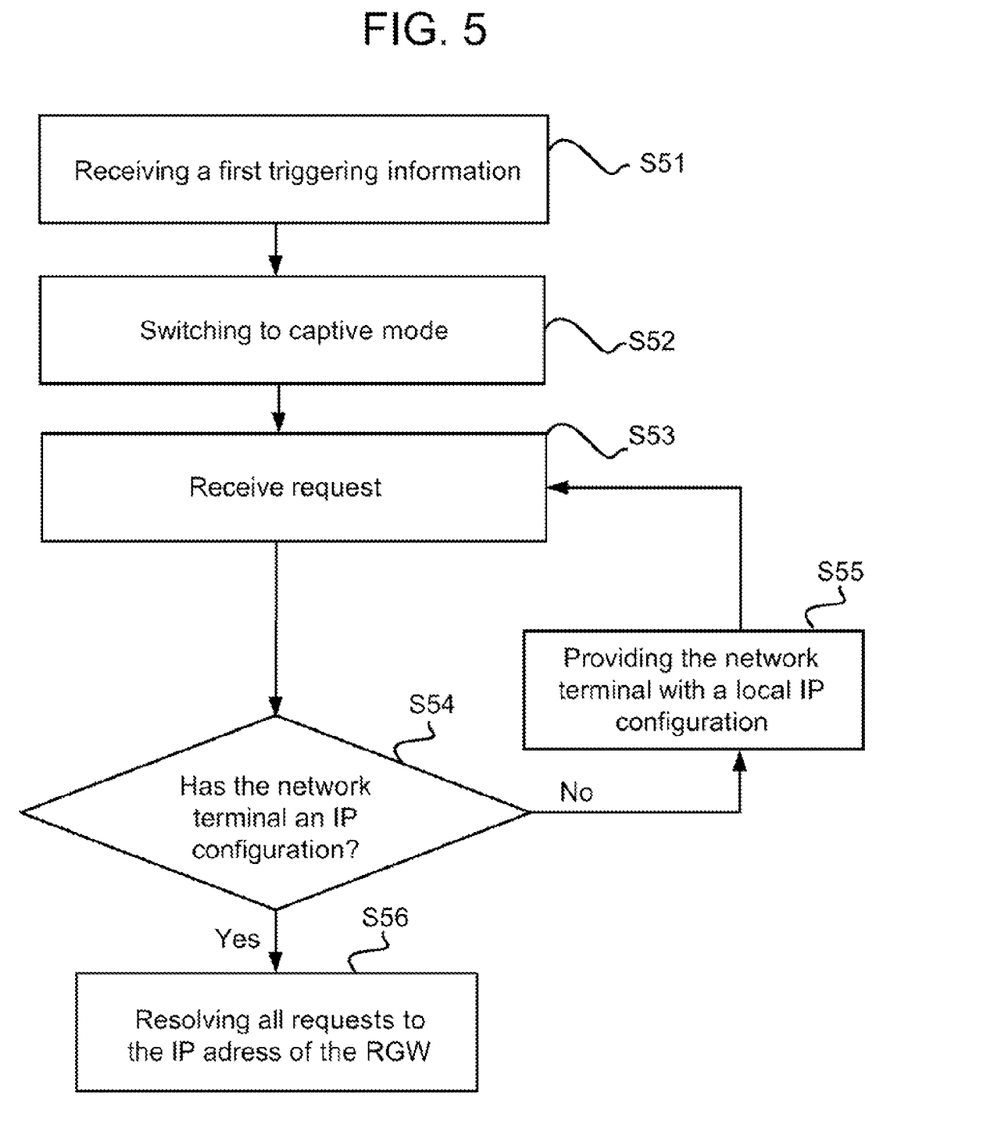
FIG. 5 is a flowchart illustrating a method according to another exemplary embodiment of the invention.

FIG. 5 is a flowchart illustrating a method according to another exemplary embodiment of the invention. In this method, the steps S51 and S52 are identical to the steps S41 and S42, respectively, in the previous embodiment described with reference to FIG. 4.

In step S53, the residential gateway 1 may receive any request from a network terminal 2A, 2B, 2C. This request may, for example, be a DHCP request indicating that the network terminal 2A, 2B, 2C has not yet been assigned an IP configuration. In step S54, the residential gateway 1 may check if the request received in step S53 indicates that the network terminal 2A, 2B, 2C has not been assigned an IP configuration.

If the request received in step S53 indicates that the network terminal 2A, 2B, 2C already has been assigned an IP configuration, the residential gateway 1 may continue to step S56. Step S56 is identical to the step S43 in the previous embodiment described with reference to FIG. 4.

However, if the request received in step S53 indicates that the network terminal 2A, 2B, 2C has not been assigned an IP configuration, the residential gateway 1 may in step S55 provide the network terminal 2A, 2B, 2C with a local IP configuration. The residential gateway 1 may then go back to step S53 and wait for a new request to be sent from the network terminal 2A, 2B, 2C.

By performing the steps S53-S55 above, it should be noted that the residential gateway 1 may provide the network terminals 2A, 2B, 2C with an appropriate local IP configuration, if the network terminals 2A, 2B, 2C has not yet been assigned an IP configuration.

Figure 6:
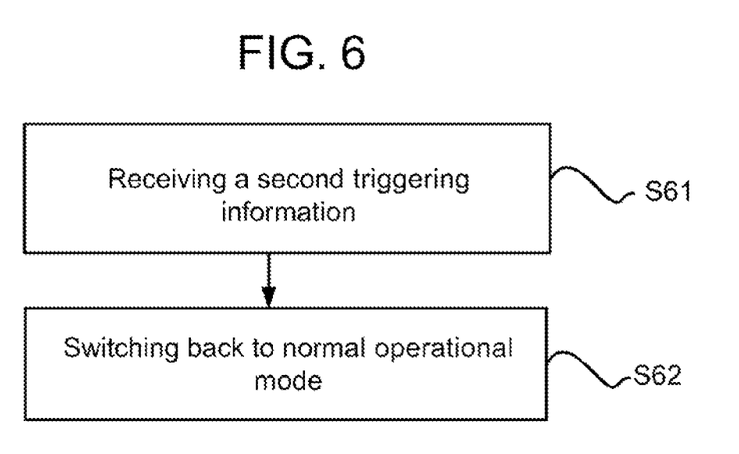
FIG. 6 is a flowchart illustrating a method according to a further exemplary embodiment of the invention.

FIG. 6 is a flowchart illustrating a method according to another further exemplary embodiment of the invention. In step S61, the residential gateway 1 may receive a second triggering information indicating that an end user of the network terminals 2A, 2B, 2C is requesting the residential gateway 1 to return to a normal operational mode. In step S62, the residential gateway 1 may, in response to receiving the second triggering information in step S61, switch back to the normal operational mode.

It should be noted that the inventive methods described above in reference to FIGS. 4-6 may be used separately or in any combination.

The description above is of the best mode presently contemplated for practicing the invention. The description is not intended to be taken in a limiting sense, but is made merely for the purpose of describing the general principles of the invention. The scope of the invention should only be ascertained with reference to the issued claims.

The invention claimed is:

1. A network node arranged to provide an end user of a network terminal in a local network with an access link to an external network, said network node being connected between said local network and said external network, said network node comprising:

a control unit arranged to switch said network node from a normal operational mode into a captive mode, in which said control unit is further arranged to intercept any request from said network terminal to said external network, and resolve said request to an Internet protocol (IP) address of said network node in said local network such that gateway information to said end user of said network terminal is provided, wherein, said control unit is arranged to switch said network node from said normal operational mode into said captive mode in response to receiving a first triggering information, wherein said first triggering information is a remotely sent triggering signal, or a detected error in connecting towards said external network or reaching a domain name server, and wherein said control unit in said captive mode is further arranged to provide said network terminal with an appropriate IP configuration, if said request indicates that said network terminal has not been assigned an IP configuration.

2. The network node according to claim 1, wherein said request from said network terminal is a domain name server request and a hypertext transfer protocol (HTTP) request.

3. The network node according to claim 1, wherein said control unit in said captive mode is further arranged to provide said network terminal with said appropriate IP configuration upon receiving a dynamic host configuration protocol (DHCP) request from said network terminal.

4. The network node according to claim 1, wherein said control unit is arranged to in response to receiving a second triggering information, switch said network node back to said normal operational mode.

5. The network node according to claim 4, further comprising:

an input device arranged to transmit said first and second triggering information to said control unit in said network node in response to receiving a manual input.

6. The network node according to claim 5, wherein said input device is a button located on said network node.

7. The network node according to claim 4, wherein said second triggering information is provided to said control unit by said end user of said network terminal through a web page, which is associated with an IP address of said network node and used by said control unit to provide said gateway information to said end user of said network terminal, by clicking a button, link or similar web page object displayed by said web page in an active window of a browser in said network terminal.

8. The network node according to claim 1, wherein said network node is a residential gateway and said local network is a residential network.

9. A method for use in a network node providing an end user of a network terminal in a local network with an access link to an external network, said network node being arranged to be connected between said local network and said external network, said method comprising the steps of:

switching from a normal operational mode into a captive mode;

intercepting any request from said network terminal to said external network; and resolving said request to an Internet protocol (IP) address of said network node in said local network such that gateway information to said end user of said network terminal is provided; said method further comprising:

switching from said normal operational mode into said captive mode in response to receiving a first triggering information, wherein said first triggering information is a remotely sent triggering signal, or a detected error in connecting towards said external network or reaching a domain name server, and providing said network terminal with an appropriate IP configuration, if said request indicates that said network terminal has not been assigned an IP configuration.

10. The method according to claim 9, further comprising the steps of:

providing said network terminal with said appropriate IP configuration upon receiving a dynamic host configuration protocol (DHCP) request from said network terminal.

11. The method according to claim 9, further comprising the steps of:

in response to receiving a second triggering information, switching said network node back to said normal operational mode.

12. A non-transitory, computer readable storage medium, which when run in a control unit in a network node causes said control unit to perform the steps of:

switching said network node from a normal operational mode into a captive mode;

intercepting any request from a network terminal to an external network; and resolving said request to an Internet protocol (IP) address of said network node in a local network such that gateway information to an end user of said network terminal is provided; said non-transitory, computer readable storage medium further causing said control unit to perform the steps of:

switching said network node from said normal operational mode into said captive mode in response to receiving a first triggering information, wherein said first triggering information is a remotely sent triggering signal, or a detected error in connecting towards said external network or reaching a domain name server, and providing said network terminal with an appropriate IP configuration, if said request indicates that said network terminal has not been assigned an IP configuration.

\* \* \* \* \*